United States Patent [19]
Little et al.

[11] Patent Number: 5,497,852
[45] Date of Patent: Mar. 12, 1996

[54] AUTOMATIC LUBRICATION SYSTEM

[75] Inventors: John Little; Jeffrey Kotyk, both of St. Louis; James B. Grove, Chesterfield, all of Mo.

[73] Assignee: McNeil Corporation, St. Paul, Minn.

[21] Appl. No.: 421,046

[22] Filed: Apr. 12, 1995

[51] Int. Cl.[6] .................................................. F16N 27/00
[52] U.S. Cl. .................. 184/7.4; 184/6.4; 184/29
[58] Field of Search .................... 184/6.4, 7.4, 8, 184/29

[56] References Cited

U.S. PATENT DOCUMENTS

| | | | |
|---|---|---|---|
| 2,038,287 | 4/1936 | Hawks et al. | 184/7.4 |
| 2,048,003 | 7/1936 | Hawks | 184/7.4 |
| 2,048,323 | 7/1936 | Cutts . | |
| 2,612,237 | 9/1952 | Tear . | |
| 2,635,710 | 4/1953 | Tear . | |
| 2,742,978 | 4/1956 | Peterson et al. . | |
| 2,814,422 | 11/1957 | Mercier . | |
| 3,035,661 | 5/1962 | Bystricky et al. . | |
| 3,064,759 | 11/1962 | Acker | 184/7.4 |
| 3,127,954 | 4/1964 | Callahan et al. . | |
| 3,135,803 | 6/1964 | Graefe . | |
| 3,145,803 | 8/1964 | Cobert . | |
| 3,298,460 | 1/1967 | Porter et al. . | |
| 3,353,712 | 11/1967 | Prescott | 184/7.4 |
| 3,526,322 | 9/1970 | Roberts | 184/7.4 |
| 4,186,821 | 2/1980 | Wegmann . | |
| 4,444,292 | 4/1984 | Brown et al. . | |
| 4,467,892 | 8/1984 | Van de Bogert . | |
| 4,520,848 | 6/1985 | Lucian et al. . | |
| 4,860,857 | 8/1989 | Warner . | |
| 5,060,760 | 10/1991 | Long et al. . | |
| 5,137,117 | 8/1992 | Mangen et al. . | |
| 5,372,220 | 12/1994 | Jacobs et al. . | |
| 5,381,874 | 1/1995 | Hadank et al. . | |

FOREIGN PATENT DOCUMENTS 3904953  7/1990  Germany ......................... 184/7.4

*Primary Examiner*—Thomas E. Denion
*Attorney, Agent, or Firm*—Senniger, Powers, Leavitt & Roedel

[57] ABSTRACT

An automatic lubrication system comprising a series of divider valves operable periodically through a cycle in which charges of lubricant are delivered one after another in sequence to a plurality of points of lubrication, the valves being supplied with lubricant from a reservoir holding a supply of lubricant under pressure via an on-off control valve, the latter being controlled by a timer operable on receiving a timing start signal to time out an OFF period during which the control valve is closed, and having a sensor device responsive to completion of a cycle of operation to send a timing start signal to the timer, the supply of lubricant under pressure in the reservoir serving as both a power source for the operation of the valves and as a source of lubricant for delivery to the points of lubrication.

17 Claims, 6 Drawing Sheets

AUTOMATIC LUBRICATION SYSTEM

BRIEF DESCRIPTION OF THE INVENTION

This invention is in the field of automatic lubrication systems, relating more particularly to an automated self-powered lubricating system for automatically periodically delivering metered charges of lubricant from a supply to a plurality of points of lubrication.

The invention is especially concerned with the provision of an automated lubrication system having a plurality of lubricant metering devices, each operable by lubricant under pressure, for periodically dispensing metered charges of lubricant to a plurality of points of lubrication.

Among the several objects of the invention may be noted the provision of a system of the class described which is self-powered for operation periodically in cycles in each of which the lubricant devices are operable for delivery of a metered charge of lubricant to each point of lubrication, with a predetermined time interval or dwell, which may be varied, between cycles; the provision of such a system in which the source of power for operation of the system involves a supply under pressure of the lubricant to be dispensed, the system being chargeable with a supply of lubricant under pressure for powering operation of the system and supplying lubricant for dispensing to the points of lubrication over a relatively prolonged period of time, e.g. for operation in cycles at time intervals from two hours to thirty days; the provision of such a system for automatic periodic operation in cycles in each of which the metered changes of lubricant are delivered one after another in a predetermined sequence; the provision of such a system for such periodic lubrication at a reduced cost per point of lubrication; and the provision of such a system which may be mounted in a position generally central with respect to the points of lubrication being serviced.

In a specific embodiment of the invention as herein disclosed, the lubricant metering devices of the system are divider valves such as shown in U.S. Pat. Nos. 3,298,460 and 4,186,821, these two patents and particularly the latter being incorporated herein by reference.

In general, an automated self-powered lubrication system of this invention, adapted for automatic periodic operation through a cycle in which metered charges of lubricant are delivered to a plurality of points of lubrication, comprises a plurality of lubricant metering devices, each operable by lubricant under pressure, for dispensing metered charges of lubricant to points of lubrication, and a reservoir for holding lubricant under pressure for supplying the metering devices with lubricant under pressure serving as both a power source for the operation of the devices and as a source of the lubricant to be dispensed. The reservoir is chargeable with lubricant and adapted to be conditioned for pressurizing the lubricant for a prolonged period of operation of the system, being interconnected with said metering devices for supplying power for operating said devices as well as supplying lubricant to be dispensed thereby. The system further comprises means controlling delivery of pressurized lubricant from the reservoir to said metering devices, and closed loop control means comprising a timer operable upon receiving a timing start signal to effect operation of said delivery control means to cut off delivery of the pressurized lubricant from the reservoir to said metering devices and to time out a dwell period during which said delivery control means cuts off said delivery and the system dwells, and operable upon termination of said dwell period to effect operation of said delivery control means to provide for delivery of pressurized lubricant from the reservoir to the metering devices for operating said devices. The closed loop control means further comprises a sensor device responsive to operation of the metering devices through a cycle to send a timing start signal to the timer to effect operation of said delivery control means to cut off delivery of the pressurized lubricant from the reservoir to said metering devices and start the timing of a dwell period. Thus, at the termination of each dwell period pressurized lubricant is delivered from the reservoir to the metering devices for operation thereof through a cycle, and delivery to the metering devices is cut off and maintained cut off after each cycle until the timer times out the next dwell period.

Other objects and features will be in part apparent and in part pointed out hereinafter.

BRIEF DESCRIPTION OF THE DRAWINGS

Corresponding reference characters indicate corresponding parts throughout several views of the drawings.

DETAILED DESCRIPTION

Figure 1:
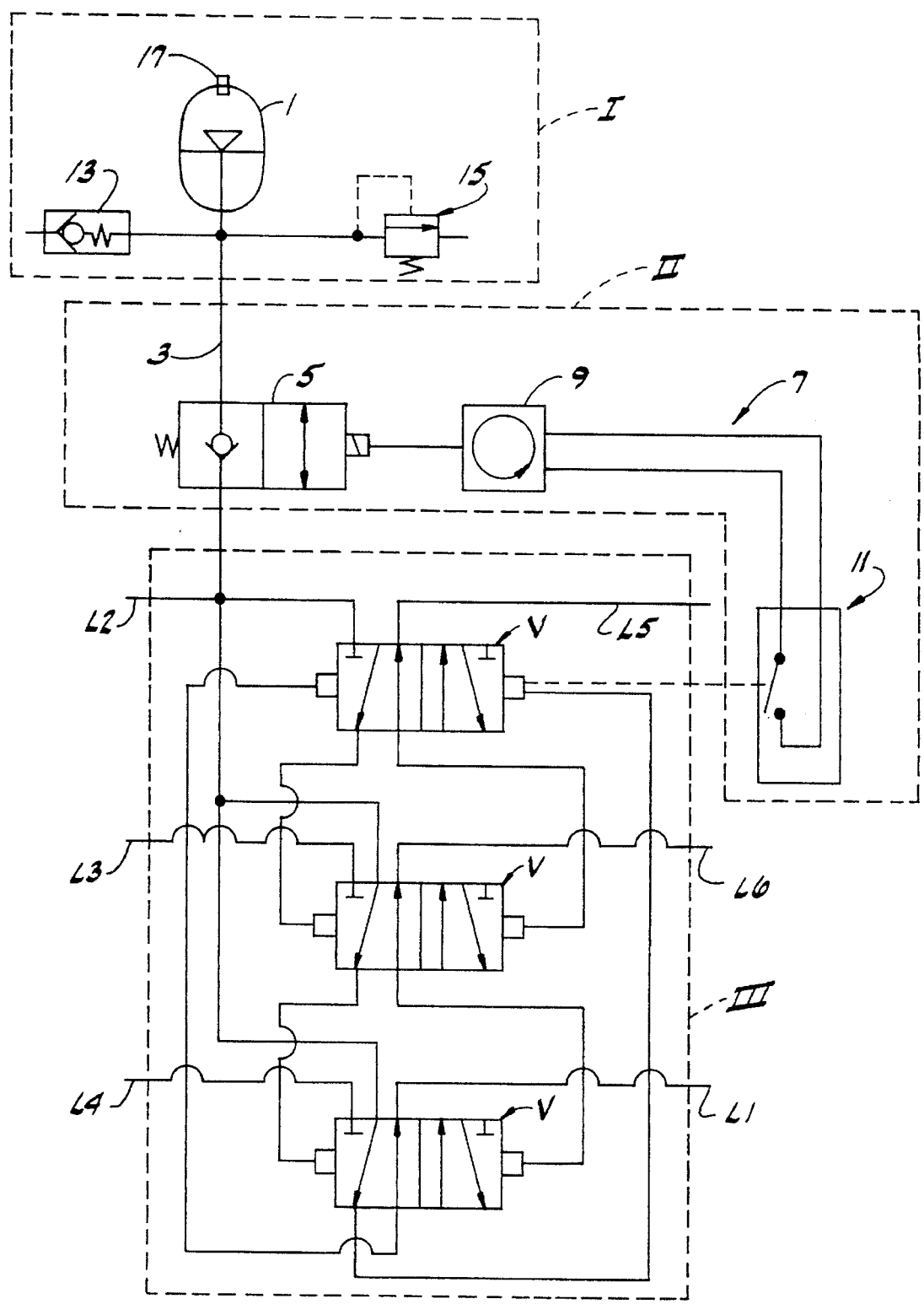
FIG. 1 is a schematic diagram illustrating the basic principles of the automatic lubrication system of this invention.

Referring first to FIG. 1 of the drawings, an automated self-powered lubrication system of this invention, adapted for automatic periodic operation through a cycle in which metered charges of lubricant are delivered to a plurality of points of lubrication, is shown basically to comprise a plurality of lubricant metering devices, each designated V, and each operable by lubricant under pressure, for dispensing metered charges of lubricant to points of lubrication. As illustrated in FIG. 1, there are three lubrication devices V each capable of delivering two metered charges on a cycle, the three devices being interconnected for dispensing the charges in sequence through lubricant lines indicated at L1–L6 connected to respective points of lubrication (not shown). At 1 is indicated a reservoir for holding lubricant under pressure serving as both a power source for the operation of the devices V and as a source of the lubricant to be dispersed. As will be subsequently detailed, the reservoir is chargeable with lubricant and adapted to be conditioned for pressurizing the lubricant for supplying the power to operate the metering devices for a prolonged period, e.g. from 90 days up to 5400 days (14.8 years) depending on the frequency of the cycles of operation. Thus, and again for example, the reservoir may have a capacity for lubricant for powering and supplying 180 cycles. With this reservoir capacity, the system is operable for 90 days if cycled twice a day and up to 5400 days (14.8) if cycled once a month. The reservoir is interconnected as indicated at 3 with the metering devices V for supplying power for operating the metering devices as well as supplying lubricant to be dispensed thereby. At 5 is indicated means or mechanism in the interconnection 3 controlling delivery of pressurized lubricant from the reservoir to the metering devices. This means may be a solenoid valve, for example. At 7 is indicated a closed loop control means comprising a timer 9, operable upon receiving a timing start signal to effect operation of the delivery control means 5 to cut off delivery of the pressurized lubricant from the reservoir 1 to the metering devices V and to time out a dwell period during which the delivery control means 5 cuts off said delivery and the system dwells, and operable upon termination of the dwell period to effect operation of the delivery control means 5 to provide for delivery of pressurized lubricant from the reservoir 1 to the metering devices V for operating these devices. The closed loop control means 7 further comprises a sensor device indicated generally at 11 responsive to operation of the metering devices V through a complete cycle to send a timing start signal to the timer 9 to effect operation of the delivery control means 5 to cut off delivery of the pressurized lubricant from the reservoir 1 to the metering devices V and start the timing of a dwell period. Thus, at the termination of such dwell period pressurized lubricant is delivered from the reservoir 1 to the metering devices V for operation thereof through a cycle, and delivery to the metering devices is cut off and maintained cut off after each cycle until the timer 9 times out the next dwell period.

For recharging the reservoir 1 with lubricant, the lubricant line 3 which is interconnected between the reservoir and the metering devices V is provided upstream from the means 5 with a conventional lubricant fitting such as indicated at 13 having a check valve therein for connection to line 3 of a lubricant line (not shown) supplied with lubricant under pressure from a suitable source (not shown). Recharging of the reservoir is carried out when means 5 closes off line 3 so that the lubricant is delivered to the reservoir 1 and not the devices V. A pressure relief or safety valve 15 is interconnected with line 3 for preventing overloading of the reservoir. Delivery of lubricant under pressure via the fitting 13 is discontinued when lubricant starts to discharge from the safety valve 15. The lubricant in the reservoir is pressurized by charging the reservoir with gas under pressure as, for example, by means of a gas valve at 17.

The arrangement is such that, at the termination of each dwell period (timed out by the timer 9) pressurized lubricant is delivered from the reservoir 1 to the metering devices V for operation thereof through a cycle in which the charges are delivered one after another in sequence through the lines L1–L6 to the points of lubrication. On completion of the cycle, i.e. delivery of the last of the charges (through line L6), the sensor device 11 functions to send a signal to the timer 9 to actuate the control means 5 (e.g. a solenoid valve) to cut off the delivery of lubricant to the metering devices and maintaining delivery cut off until the timer times out the next dwell period. The metering devices V are interconnected for operation in the sequence described, the last charge being delivered from the right-hand end of the uppermost valve V as illustrated in FIG. 1 and the sensor device 11 being actuated upon delivery of said last charge.

The system as above described may be regarded as comprising three modules, as follows:

Module I: The pressurized reservoir 1 with the lubricant fitting 13 (check-valved inlet) and the pressure relief or safety valve 15;

Module II: The system control comprising the solenoid valve 5, the adjustable timer 4 and the sensor device 11 for signalling one full cycle for closed loop feedback output;

Module III: The positive displacement self-actuating sequential means comprising lubricant dispensing devices V (which may also be referred to as a cyclic lubricant distribution) acting as a pressure activated metering means.

Figure 2:
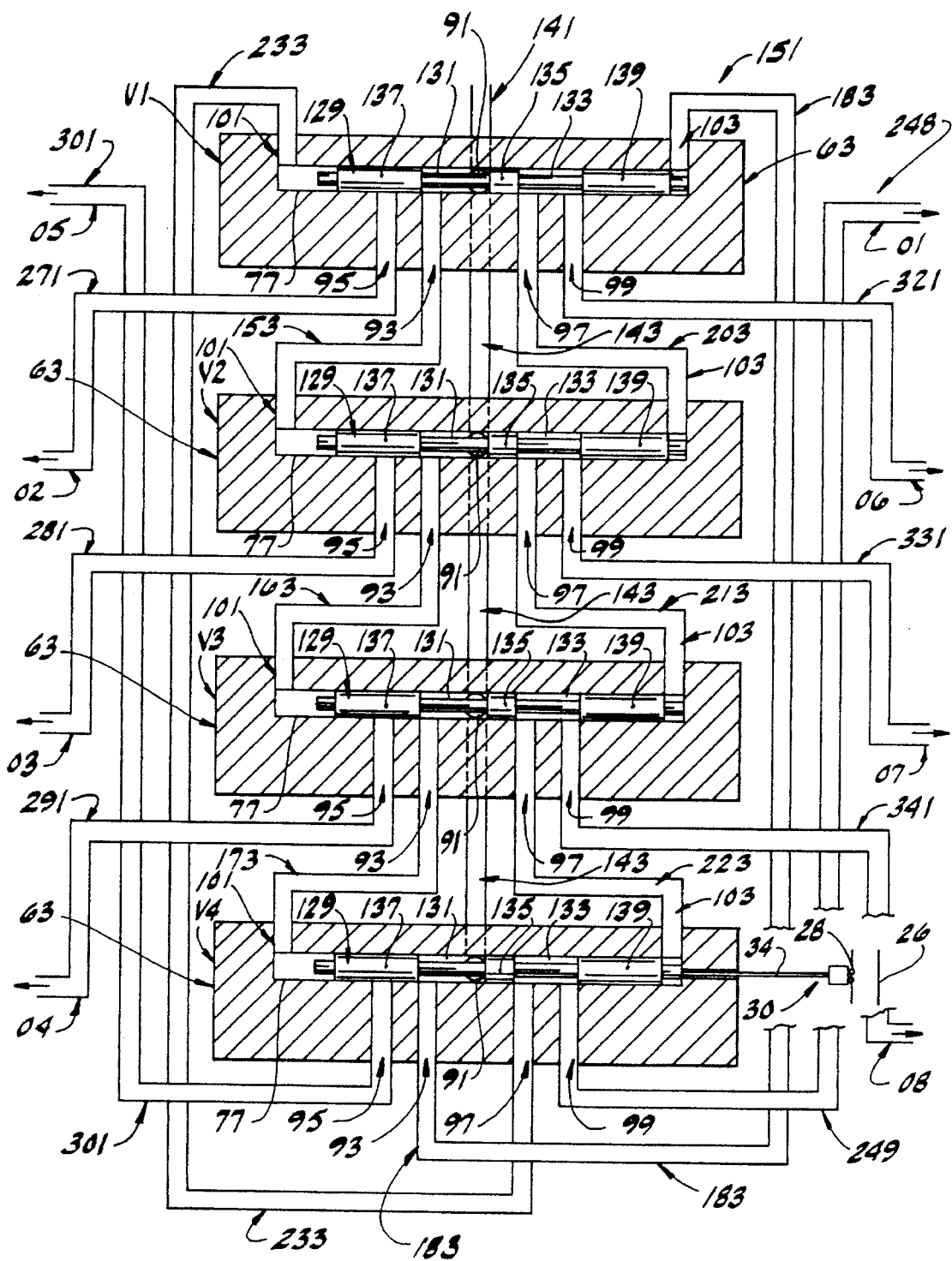
FIG. 2 is a semi-diagrammatic view of part of a system of this invention comprising divider valves as the metering devices, this view being similar to FIG. 18 of the aforesaid U.S. Pat. No. 4,186,821, showing passaging of a divider valve assembly of the system, and showing diagrammatically a sensor device of the system.

Referring to FIG. 2 of the drawings, an automatic lubrication system of this invention is shown to comprise a series of four lubricant metering devices corresponding to the three shown in FIG. 1, more particularly a series of four divider valves such as disclosed in the aforesaid U.S. Pat. No. 4,186,821, which is incorporated herein by reference, and hereinafter referred to as the '821 patent. The four divider valves are designated V1–V4 the same as in said '821 patent. The same reference characters are used for the valves V1–V4 here as in said '821 patent. As disclosed in said '821 patent and illustrated in FIG. 2 here, each of the valves comprises an elongate valve block 63 having a bore 77 extending endwise thereof, with an inlet passage 91 for admission of lubricant under pressure to the bore, and further having first, second, third and fourth transfer passages 93, 97, 101 and 103 for interconnection of the four valves in the series, outlet passages 95 and 99 for delivery of charges of lubricant under pressure to points of lubrication, and a valve member 129, more particularly a piston member, axially slidably movable in the bore between a position toward the right as viewed in FIG. 2 for each of the four valves determined by its engagement with the right end of the bore, which is referred to as its first position, and a position toward the left as viewed in FIG. 2 determined by its engagement with the left end of the bore, which is referred to as its second position.

The piston member 129 of each valve V1–V4 has annular grooves 131, 133 between a central land 135 and end lands 137 and 139. In its first position, land 137 blocks passage 95, groove 131 interconnects passages 91 and 93 and groove 133 interconnects passages 97 and 99. In its second position, the relationship is reversed, i.e., land 139 blocks passage 99, groove 133 interconnects passages 91 and 97, and groove 131 interconnects passages 93 and 95. The piston member 129 is movable toward the right to its stated first position upon delivery of lubricant under pressure via passage 101 to the left end of the bore 77 and, in moving to the right to its first position, forces a measured amount of lubricant out of the right end of the bore 77 via passage 103. Similarly, but in reverse, the piston member 129 is movable toward the left to its stated second position upon delivery of lubricant under pressure via passage 103 to the right end of the bore 77 and, in moving to the left to its second position, forces a measured amount of lubricant out of the left end of the bore 77 via passage 101.

Passaging designated in its entirety by the reference numeral 141 is provided for delivery of lubricant to the inlet passages 91 of the valves V1–V4. This passaging 141 comprises an inlet manifold 143. Passaging for interconnection of the transfer passages 93, 97, 101 and 103 of the valves V1–V4 is shown to comprise:

(1) Passaging 153 interconnecting passage 93 of valve V1 and passage 101 of valve V2.

(2) Passaging 163 interconnecting passage 93 of valve V2 and passage 101 of valve V3.

(3) Passaging 173 interconnecting passage 93 of valve V3 and passage 101 of valve V4.

(4) Passaging 183 interconnecting passage 93 of valve V4 and passage 103 of valve V1.

(5) Passaging 203 interconnecting passage 97 of valve V1 and passage 103 of valve V2.

(6) Passaging 213 interconnecting passage 97 of valve V2 and passage 103 of valve V3.

(7) Passaging 223 interconnecting passage 97 of valve V3 and passage 103 of valve V4.

(8) Passaging 233 interconnecting passage 97 of valve V4 and passage 101 of the valve V1.

Passaging designated in its entirety by the reference numeral 248 is provided for delivery of lubricant from passages 95 and 99 to outlets O1–O8, this outlet delivery passaging comprising the following:

(9) Passaging 249 interconnecting passage 99 of valve V4 and outlet O1.

(10) Passaging 271 interconnecting passage 95 of valve V1 and outlet O2.

(11) Passaging 281 interconnecting passage 95 of valve V2 and outlet O3.

(12) Passaging 291 interconnecting passage 95 of valve V3 and outlet O4.

(13) Passaging 301 interconnecting passage 95 of valve V4 and outlet O5.

(14) Passaging 321 interconnecting passage 99 of valve V1 and outlet O6.

(15) Passaging 331 interconnecting passage 99 of valve V2 and outlet O7.

(16) Passaging 341 interconnecting passage 99 of valve V3 and outlet O8.

It will be understood that the four divider valves V1–V4 may be mounted on base blocks having passaging therein as shown in said '821 patent, the base blocks also having lubricant outlets O1–O8 at the ends thereof. Reference may be made to said '821 patent for full details. The outlets O1–O8 deliver the measured (metered) charges of lubricant via lubricant lines (not shown) to points of lubrication (eight in all as herein illustrated by way of example).

Figure 3:
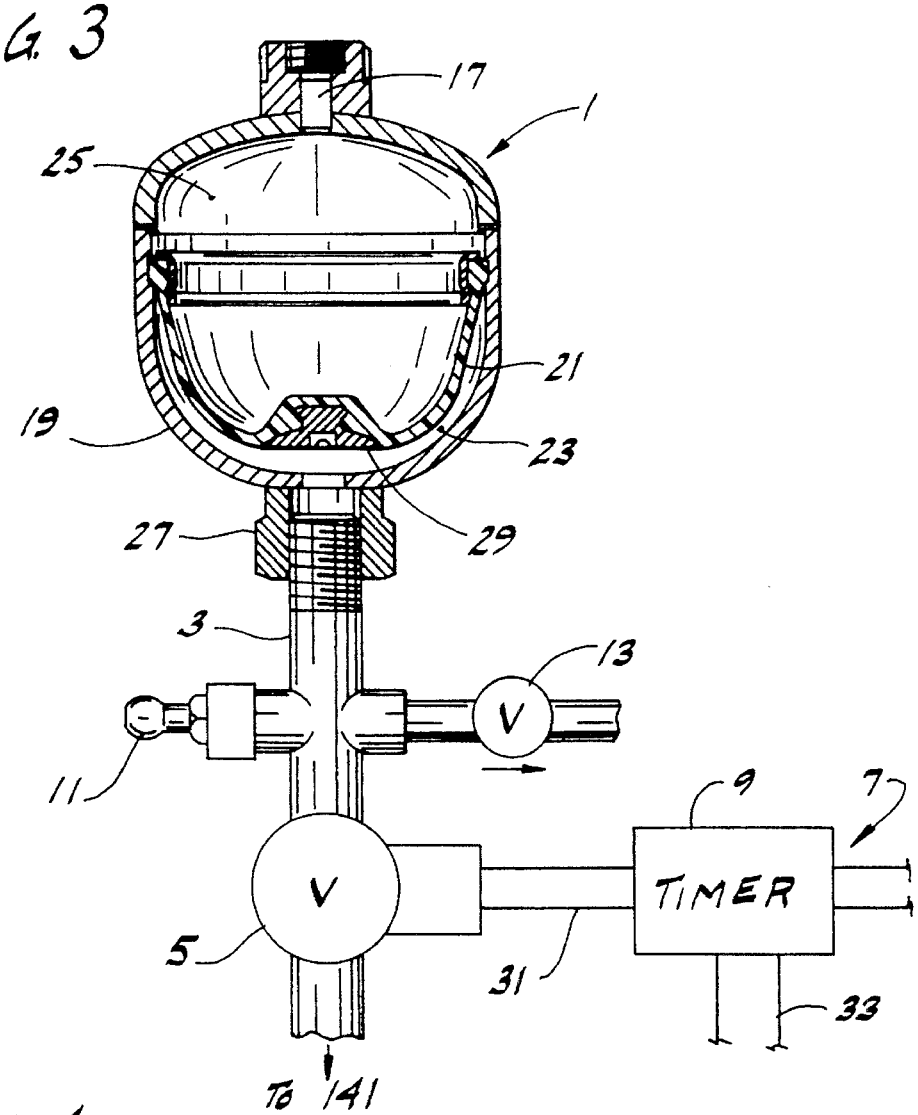
FIG. 3 is a view showing lubricant supply means for the divider valve assembly shown in FIG. 2, including the reservoir, means for charging the reservoir with lubricant and conditioning it for pressurizing the lubricant; and means controlling delivery of pressurized lubricant from the reservoir to the divider valves (the metering devices), and the timer of the closed loop control means.

As shown in FIG. 3, a reservoir corresponding to the reservoir 1 shown in FIG. 1 is provided for holding a supply of lubricant under pressure for delivery to the inlet passages 91 of the valves V1–V4. This reservoir may be a commercially available type of reservoir referred to as a diaphragm-type accumulator comprising a pressure vessel 19 having therein a diaphragm 31 made of an elastic material such as an elastomer dividing the space in the vessel into a chamber 23 for lubricant and a chamber 25 for a gas such as nitrogen under pressure for pressurizing the lubricant in the lubricant chamber 23. Gas valve 17 is provided for introducing gas under pressure into chamber 25. A fluid connection 27 is provided for delivery of lubricant under pressure from chamber 19. A plate 29 is provided on the diaphragm for preventing the diaphragm from being forced into the fluid connection 27 if the reservoir (accumulator) is completely emptied.

At 3 in FIG. 3 is indicated a lubricant line corresponding to line 3 shown in FIG. 1 interconnected between the fluid connection 27 of the reservoir 1 and the passaging 141 (including manifold 143) for delivery of lubricant via passaging 141 and manifold 143 to the inlet passages 91 of the valves V1–V4. In line 3 is the lubricant delivery control means 5, more particularly an on-off control valve 5, such as an electrically operated valve, e.g. a solenoid valve, adapted to open on being energized for delivery of lubricant under pressure from the reservoir 1 to the inlet manifold 143 for the inlet passages 91 of the valves V1–V4, and to close upon being deenergized. The solenoid valve 5 is connected in an electrical circuit 31 with a timer 9 corresponding to the timer 9 shown in FIG. 1, the timer being of a type operable to determine an OFF time or dwell period for the valve 5 (during which the valve 5 is deenergized and closed) and to effect energization of the valve 5 thereby to open it when the timer has timed out the OFF time or dwell period, and to maintain the valve 5 energized so that it is held open until the timer receives an electrical signal to open the circuit for valve 5 and start another dwell period. A timer which has been used and is quite suitable for the purpose is a Model EPC-13154 Lubrication System Timing Controller sold by Artisan Controls Corporation, P.O. Box 233, 5 Eastmans Road, Suite 100, Parsippany, New Jersey. This timer is adapted for being set to time out OFF periods of two hour, four hour, six hour etc. duration up to thirty-two hours, and OFF periods of two day, four day, six day etc. duration up to thirty-two days.

The timer 9 is connected in an electrical circuit 33 with a sensor switch 35 of a sensor device 11 corresponding to the sensor device 11 shown in FIG. 1, the sensor device being responsive to completion of a complete cycle of operation of the valves V1–V4 involving delivery of eight metered charges of lubricant (eight shots of lubricant) to signal the timer to break the circuit 31 for the valve 5 thereby to close valve 5 and also to start the timing out of an OFF period or dwell period by the timer (the next OFF period or dwell period). As herein illustrated, the sensor device acts in response to movement of the piston member 129 of valve V4 from its stated second (left) position back to its stated first (right) position to deliver the eighth charge of lubricant to the outlet O8 line (the last delivery of the cycle). For this purpose, the sensor device 11 may employ as the sensor switch 15 a reed switch, and as an actuator for the reed switch a magnetic member 37 on the end of a pin 39 extending from the right end of the piston member 129 of the valve V4 through a hole 41 in a plug 43 for the right end of the bore 77 of valve V4. The pin 39 carrying the magnetic member 37 is slidable in the hole 41 with suitable provision for sealing against leakage of lubricant through the hole, such as the O-ring indicated at 45 in FIG. 4 in a counterbore 47 in plug 43 compressed on the pin 39 by a gland 49 threaded in the counterbore. When the piston member 129 of valve V4 is in its stated second position (toward the left of the bore 77) the pin 39 and the magnetic member 37 occupy a retracted position wherein the magnetic member is out of the range of actuation of the reed switch 35. The latter is then open, breaking the circuit 33. When the piston member 129 of valve V4 moves to the right to its stated first position for discharge of the eighth shot of lubricant from the right end of bore 77 of valve V4 to and through the outlet O8, the magnetic member moves into actuating proximity to the reed switch 35, whereupon the latter closes and completes circuit 33 for the timer, causing the latter to break the circuit 31 to deenergize and thereby close the valve 5, and to start the timing of the next OFF or dwell period of the system.

When the timing out of the dwell or OFF period has been completed by the timer 5, the timer acts to complete the circuit 31 for the valve 5 and the valve 5 opens for delivery of lubricant under pressure from the reservoir 2 to the manifold 143 and thence to the inlet passages 91 of the valves V1–V4. This starts a lubrication cycle (an eight-shot cycle as herein shown and described). As illustrated in FIG. 2, at the start of a cycle the piston member 129 of each of the four divider valves V1–V4 is in its stated first position toward the right. Lubricant is delivered from the inlet manifold 143 to inlet passage 91 of valve V4 and passes via groove 131 of the piston member 129 of valve V4 to passage 93 of valve V4, thence via passaging 183 to passage 103 of valve V1 and the right end (as viewed in FIG. 2) of the bore 77 of valve V1. This drives piston member 129 of valve V1 to the left, forcing a metered charge of lubricant out of the left end of the bore of valve V1 through passaging 233 to passage 97 of valve V4, thence via groove 133 of the piston member of valve V4 to passage 99 of valve V4 and thence via passaging 249 to outlet O1.

With the piston member 129 of valve V1 in its left-hand position, lubricant is delivered from manifold 143 to passage 91 of valve V1. It passes via groove 133 of the piston member 129 of valve V1 to passage 97 of valve V1, thence via passaging 203 to passage 103 of valve V2 and the right end of the bore of valve V2. This drives piston member 129 of valve V2 to the left, forcing a metered charge of lubricant out of the left end of the bore of valve V2 through passage 101 of valve V2, passaging 153, passage 93 of valve V1, groove 131 of the piston member (now in its left position) of valve V1, passage 95 of valve V1, and passaging 271 to outlet O2.

With the piston member 129 of valve V2 in its left-hand position, lubricant is delivered from manifold 143 to passage 91 of valve V2. It passes via groove 133 of the piston member 129 of valve V2 to passage 97 of valve V2, thence via passaging 213 to passage 103 of valve V3 and the right end of the bore of valve V3. This drives piston member 129 of valve V3 to the left, forcing a metered charge of lubricant out of the left end of the bore of valve V3 through passage 101 of valve V3, passaging 163, passage 93 of valve V2, groove 131 of the piston member (now in its left position) of valve V2, passage 95 of valve V2, and passaging 271 to outlet O3.

With the piston member 129 of valve V3 in its left-hand position, lubricant is delivered from manifold 143 to passage 91 of valve V3. It passes via groove 133 of the piston member 129 of valve V3 to passage 97 of valve V3, thence via passaging 223 to passage 103 of valve V4 and the right end of the bore of valve V4. This drives piston member 129 of valve V4 to the left, forcing a metered charge of lubricant out of the left end of the bore valve V4 through passage 101 of valve V4, passaging 173, passage 93 of valve V3, groove 131 of the piston member (now in its left position) of valve V3, passage 95 of valve V3, and passaging 291 to outlet O4.

With the piston member 129 of valve V4 in its left-hand position, lubricant is delivered from manifold 143 to passage 91 of valve V4. It passes via groove 133 of the piston member 129 of valve V4 to passage 97 of valve V4, thence via passaging 233 to passage 101 of valve V1 and the left end of the bore of valve V1. This drives piston member 129 of valve V1 back to the right, forcing a metered charge of lubricant out the right end of the bore of valve V1 through passage 103 of valve V1, passaging 183, passage 93 of valve V4, groove 131 of the piston member (now in its left position) of valve V4, passage 95 of valve V4, and passaging 301 to outlet O5.

With the piston member 129 of valve V1 back in its right-hand position, lubricant is delivered from manifold 143 to passage 91 in valve V1. It passes via groove 131 of the piston member 129 of valve V1 to passage 93 of valve V1, thence via passaging 153 to passage 101 of valve V2 and the left end of the bore of valve V2. This drives piston member 129 of valve V2 back to the right, forcing a metered charge of lubricant out of the right end of the bore of valve V2 through passage 103 of valve V2, passaging 203, passage 97 of valve V1, groove 133 of the piston member (now in its right position) of valve V1, passage 99 of valve V1, and passaging 321 to outlet O6.

With the piston member 129 of valve V2 back in its right-hand position, lubricant is delivered from manifold 143 to passage 91 of valve V2. It passes via groove 131 of the piston member 129 of valve V2 to passage 93 of valve V2, thence via passaging 163 to passage 101 of valve V3 and the left end of the bore of valve V3. This drives piston member 129 of valve V3 back to the right, forcing a metered charge of lubricant out of the right end of the bore of valve V3 through passage 103 of valve V3, passaging 213, passage 97 of valve V2, groove 133 of the piston member (now in its right position) of valve V2, passage 99 of valve V2, and passaging 331 to outlet O7.

With the piston member 129 of valve V3 back in its right-hand position, lubricant is delivered from manifold 143 to passage 91 of valve V3. It passes via groove 131 of the piston member 129 of valve V3 to passage 93 of valve V3, thence via passaging 173 to passage 101 of valve V4 and the left end of the bore of valve V4. This drives piston member 129 of valve V4 back to the right, forcing a metered charge of lubricant out of the right end of the bore of valve V4 through passage 103 of valve V4, passaging 223, passage 97 of valve V3, groove 133 of the piston member (now in its right position) of valve V3, passage 99 of valve V3, and passaging 341 to outlet O8.

With the return of the piston member 129 of valve V4 to its right-hand position of FIG. 2, the cycle is completed (the cycle involving delivery of the metered charges of lubricant from the outlets O1–O8 one after the other). On the return of the piston member 129 of valve V4 to its right-hand position of FIG. 2, completing the eight-shot cycle, the pin 39 moves out to its extended position with resultant movement of the magnetic member 37 into actuating proximity with respect to the reed switch 35. The latter closes, completing the timer circuit 33, breaking the circuit 31 for the control valve 5. The latter thereupon closes, cutting off delivery of lubricant under pressure from the reservoir to the valves V1–V4, and thus terminating the eight-shot cycle of operation of the valves V1–V4. Also, on completion of the timer circuit 33, the timer 5 starts timing out the next OFF or dwell period (e.g. a four hour period) during which the valves V1–V4 are out of operation. At the termination of this period, the timer acts to close the circuit 31 for the control valve 5, which opens for delivery of lubricant under pressure from the reservoir to the valves V1–V4, thereby starting the next eight-shot cycle, and so on.

The timer includes a delay for delaying opening of circuit 31 and thus delaying closing of the control valve 5 until the reed switch 35 has been opened following its closure on delivery of the last shot of lubricant in the cycle (delivery of the eighth shot in the eight-shot cycle) and then re-closed. Thus, while piston member 129 of valve V4 is in its stated first position toward the right in the bore of valve V4 (as shown in FIG. 1) at the termination of a cycle and switch 35 is closed, the operation of the timer to break circuit 31 and open valve 5 for the next cycle occurs even though switch 35 is closed. Switch 35 is opened on operation of valve V4 during the next cycle by reason of piston member 129 of valve V4 shuttling to the left to its second position and then reclosed when piston member 129 of valve V4 shuttles back to the right to its first position. On the stated re-closure of switch 35, circuit 33 is completed to terminate the stated next cycle.

The reservoir 1 of the FIG. 2 system is provided with means for recharging it with lubricant and with gas for pressurizing the lubricant comprising the same components as shown in FIG. 1 (lubricant fitting 13, safety valve 15, and gas valve 17) and these components appear with the same reference characters in FIG. 2.

Figure 4:
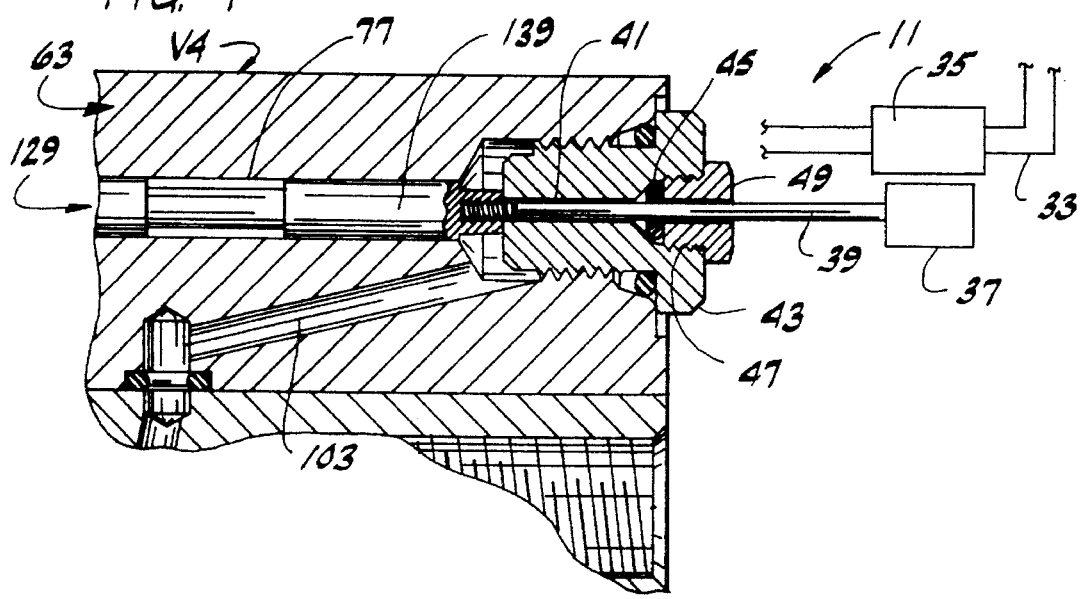
FIG. 4 is a fragment of FIG. 2 enlarged and augmented to show detail of the sensor device of the system.
Figure 5:
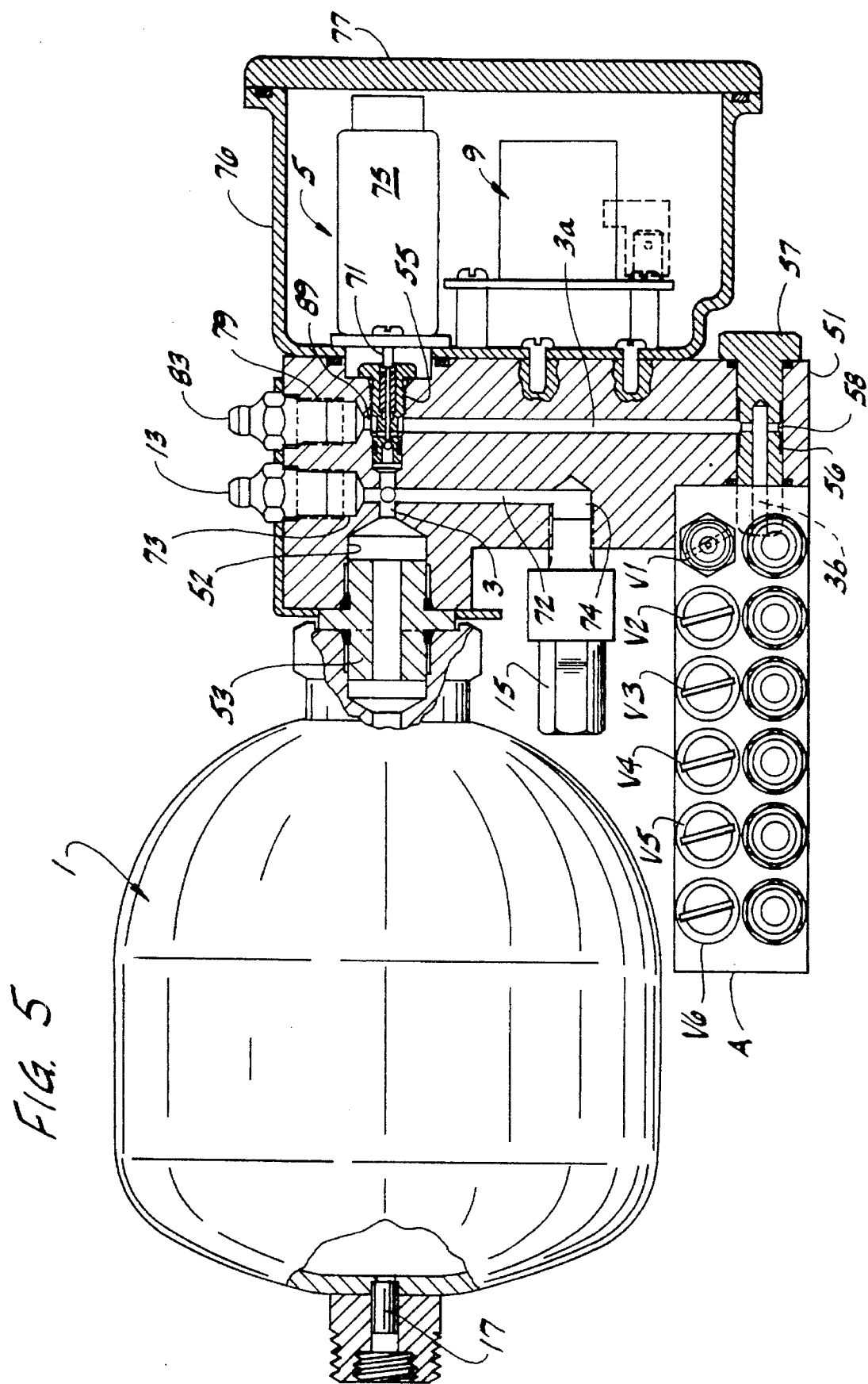
FIG. 5 is a view in side elevation, with parts broken away and shown in section, of a physical embodiment of a system of the invention.
Figure 6:
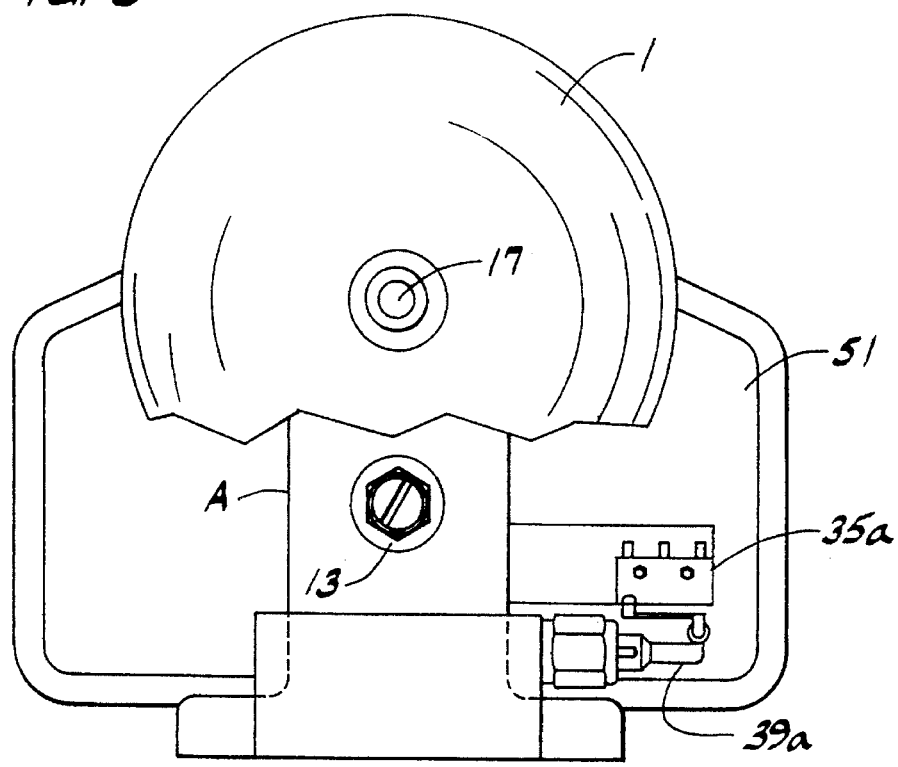
FIG. 6 is an end view of the FIG. 5 system as viewed from the left of FIG. 5, with the reservoir of the system partly broken away.
Figure 7:
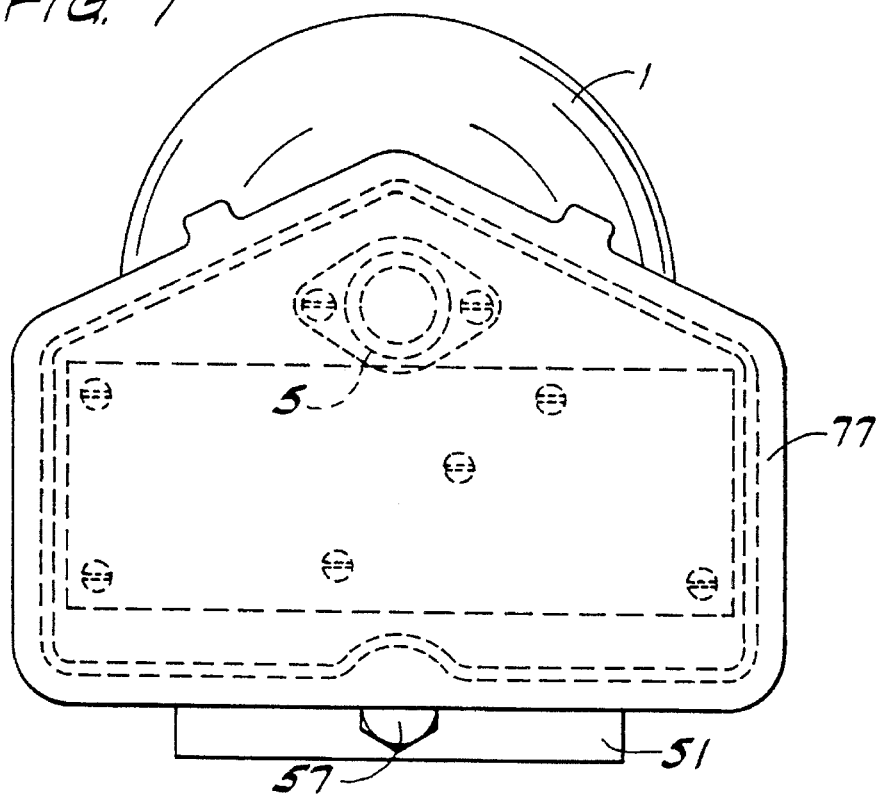
FIG. 7 is an end view of the FIG. 5 system as viewed from the right of FIG. 5.

FIGS. 5–8 illustrate a physical embodiment of the system generally shown in FIGS. 2–4 comprising a mounting block 51, which may also be referred to as a manifold, having an opening 52 at one side (its left side as shown) and adjacent the top thereof to which the reservoir, again designated 1, is connected by means of a fitting such as indicated at 53 for flow of lubricant from the reservoir to the opening. A passage part of which corresponds to line 3 above described and again designated 3 extends inwardly from the inner end of opening 52 having an enlarged portion or counterbore 54 (see FIG. 8) in which is fitted a cylindric extension 55 of the head 5a of a solenoid valve corresponding to the valve 5 above described and again designated 5 in its entirety. Extending down from the counterbore 54 is a continuation of passage 3 designated 3a. This continuation passage extends down to a bore 56 (FIG. 5) in the block 51 adjacent its bottom. Fitted in bore 56 is a plug 57 having a passage 3b in continuation of passage 3a via radial ports 58 in the plug. An assembly of divider valves corresponding to that shown in FIG. 2 and designated in its entirety by the reference character A is mounted on the block 51 extending out from the same side of the block as that to which the reservoir 1 is connected (the left side). This divider valve assembly, as illustrated in FIG. 5, comprises six divider valves (instead of four as shown in FIG. 2), the six valves being designated V1–V6.

Figure 8:
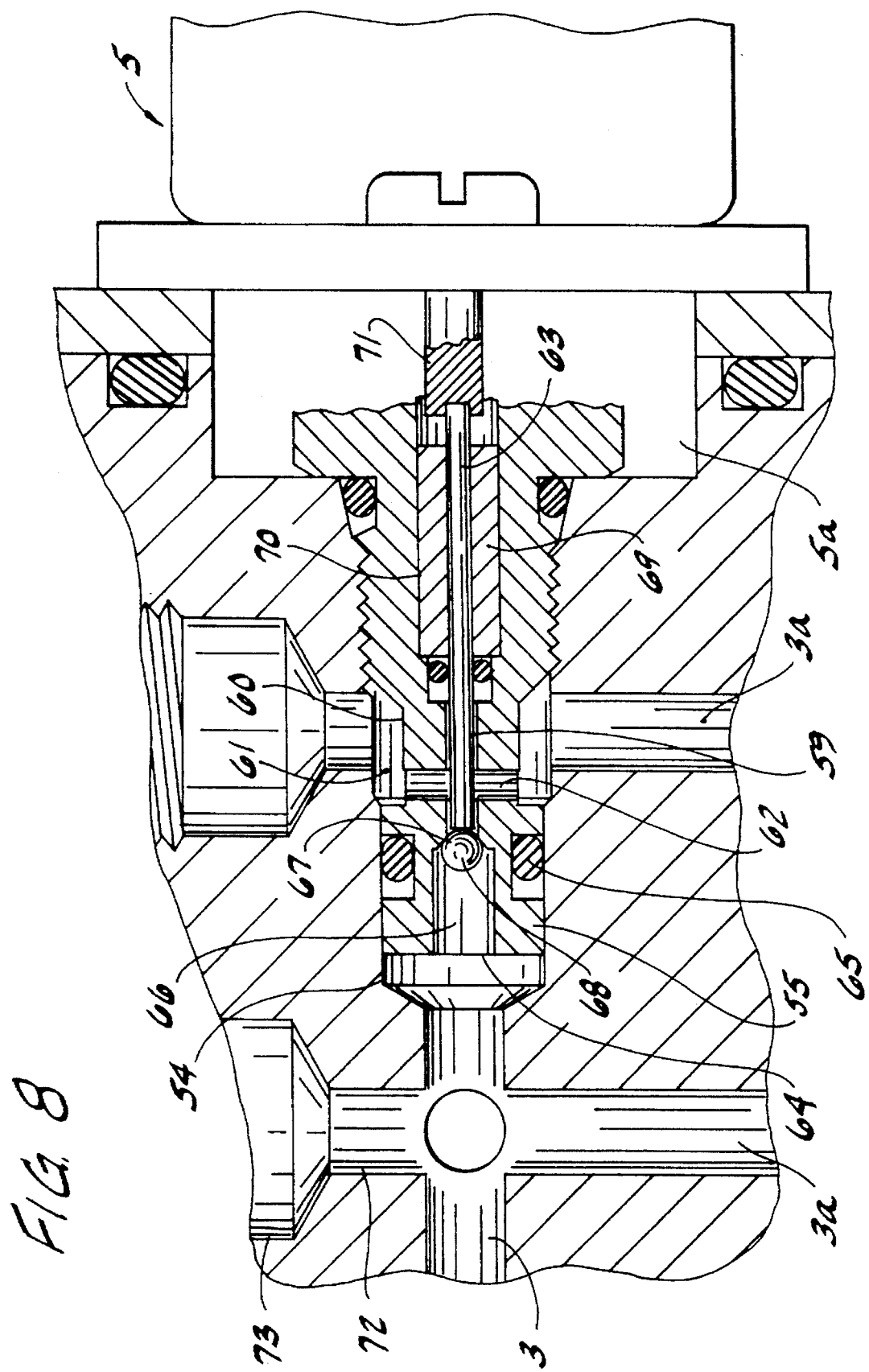
FIG. 8 is an enlarged fragment of FIG. 5.

The extension 55 of the solenoid valve has an axial bore 59, a reduced diameter section 60 providing a chamber 61 around the extension, and radial ports 62 in communication with chamber 61 and thence with passage 3a. A valve stem 63 is axially movable in the bore 59. The extension 55 extends from the right side of block 51 into the counterbore 54, terminating somewhat short of the left end of counterbore 54, and being sealed adjacent its end 64 in counterbore 54 by an O-ring seal 65. The end of the extension 55 in counterbore 54 is formed with a counterbore 66, the inner end of which is formed as a seat 67 for a valve ball 68. The ball is adapted to be held against the seat in a valve-closed position as shown in FIG. 8 by pressure of lubricant from the reservoir 1 in passage 3 and the left end of counterbore 54. The ball is adapted to be moved away from the seat 67 to a valve-open position by the valve stem 63 which is movable generally axially in the bore 59, the stem being of sufficiently smaller diameter than the diameter of the bore 59 to allow for flow of lubricant from the counterbore 66 through the space in the bore 59 around the stem 63 when the ball is pushed (to the left as viewed in FIG. 8) off its seat 67. The stem is guided for sliding movement in a tubular guide 69 fitted in a counterbore 70 in the right-hand end of extension 55. The stem is secured at its right-hand end to the plunger 71 of the solenoid valve 5. The latter includes a spring (not shown) biasing the plunger 71 and the valve stem 63 toward the right to the valve-closed position wherein the ball engages the valve seat 67, and includes a coil (not shown) which when energized drives the plunger and the valve stem to the left to unseat the ball and thus open up valve 5 for flow of lubricant under pressure from passage 3 and counterbore 66 through bore 59 and thence through the radial ports 62 to chamber 61 and down through the passage 3a. The block 51 has a passage 72 in communication with passage 3 extending down from an opening 73 in the top of the block to a side opening 74, a lubricant fitting 13 in opening 73 corresponding to the fitting 13 previously described, and a relief or safety valve corresponding to valve 15 threaded in opening 74, for charging the reservoir 1 with lubricant in the same manner as above described. A timer corresponding to the timer 9 and the case 75 of the solenoid valve 5 (containing the solenoid coil and spring) are housed in a housing 76 secured to the right side of the block 51. The housing has a removable cover 77 for access to the timer for setting it.

In the embodiment of the system shown in FIG. 5–8, the reed switch 35 is replaced by a microswitch 35a (see FIG. 6), the microswitch being operable by a pin 39a corresponding to pin 39 shown in FIG. 4 extending from the end of the piston member 129 of the valve V6 for actuating the switch 35a in the same manner as pin 39 actuates switch 35 on movement of piston member 129 of valve V6 to deliver the last of the twelve shots of lubricant delivered by valves V1–V6 in a cycle. Operation of the system shown in FIGS. 5–8 is essentially the same as above described for the system as shown in FIGS. 2–4. As shown in FIG. 5, the system of FIGS. 5–8 includes an opening 79 in the top of block 51, a passage 81 extending down from opening 79 to the chamber 61, and a lubricant fitting 83 threaded in the opening 79 for manually supplying lubricant to passages 3a and 3b, in the event manual cycling of valves V1–V6 may be needed or desired.

In view of the above, it will be seen that the several objects of the invention are achieved and other advantageous results attained.

As various changes could be made in the above constructions without departing from the scope of the invention it is intended that all matter contained in the above description or shown in the accompanying drawings shall be interpreted as illustrative and not in a limiting sense.

What is claimed is:

1. An automated self-powered lubrication system for automatic periodic operation through a cycle in which metered charges of lubricant are delivered to a plurality of points of lubrication, said system comprising:

a plurality of lubricant metering devices, each operable by lubricant under pressure, for dispensing metered charges of lubricant to points of lubrication;

a reservoir for holding lubricant under pressure for supplying the metering devices with lubricant under pressure serving as both a power source for the operation of the devices and as a source of the lubricant to be dispensed;

said reservoir being chargeable with the lubricant and adapted to be conditioned for pressurizing the lubricant for a prolonged period of operation of the system;

said reservoir being interconnected with said metering devices for supplying power for operating said devices as well as supplying lubricant to be dispensed thereby;

means controlling delivery of pressurized lubricant from the reservoir to said metering devices; and closed loop control means for the system comprising a timer operable upon receiving a timing start signal to effect operation of said delivery control means to cut off delivery of the pressurized lubricant from the reservoir to said metering devices and to time out a dwell period during which said delivery control means cuts off said delivery and the system dwells, and operable upon termination of said dwell period to effect operation of said delivery control means to provide for delivery of the pressurized lubricant from the reservoir to the metering devices for operating said devices, and a sensor device responsive to operation of the metering devices through a cycle to send a timing start signal to the timer to effect operation of said delivery control means to cut off delivery of the pressurized lubricant from the reservoir to said metering devices and start the timing of a dwell period;

whereby at the termination of each dwell period the pressurized lubricant is delivered from the reservoir to the metering devices for operation thereof through a cycle, and delivery to the metering devices is cut off and maintained cut off after each cycle until the timer times out the next dwell period.

2. An automated self-powered lubrication system as set forth in claim 1 wherein the reservoir is chargeable with gas under pressure for pressurizing the lubricant.

3. An automated self-powered lubrication system as set forth in claim 1 wherein the metering devices are operable through a cycle in which metered charges of the lubricant are delivered one after another in sequence to said points of lubrication, and the sensor device is responsive to completion of each cycle to send a signal to the timer to effect operation of said delivery control means to cut off delivery of the pressurized lubricant from the reservoir to said metering devices and to start the timing of a dwell period.

4. An automated self-powered lubrication system as set forth in claim 3 wherein the reservoir is chargeable with the lubricant and with gas under pressure for pressurizing the lubricant.

5. An automatic lubrication system for periodic operation through a cycle in which charges of lubricant are delivered one after another in sequence to a plurality of points of lubrication, said system comprising:

a series of lubricant dispensing valves each having an inlet passage for admission of the lubricant under pressure, transfer passages for interconnection of the valves in the series, at least one outlet passage for delivery of the lubricant to a point of lubrication, and a valve member movable between a first position and a second position for delivery of a charge of the lubricant through the outlet passage thereof;

passaging for interconnecting said transfer passages of said valves;

the valve members being successively movable to deliver charges of the lubricant through the outlet passages in a sequence via delivery of the lubricant under pressure through the inlet passages and interconnections between the valves established by the valve members, said transfer passages and said passaging;

a reservoir for holding a supply of the lubricant under pressure;

a line between the reservoir and the inlet passages of the valves in said series for delivery of the lubricant from the reservoir to said inlet passages;

an on-off control valve in said line for controlling the delivery of the lubricant to said inlet passages;

a timer for controlling said control valve, operable upon receiving a timing start signal to time out a period of closure during which the control valve is maintained closed and operable upon termination of said period to open the control valve and maintain it open until the next timing start signal is received, and a sensor device responsive to completion of a cycle of operation to send a timing start signal to the timer;

whereby at the termination of each period of closure of the control valve it is opened for delivery of lubricant under pressure from the reservoir to the inlet passages of the lubricant dispensing valves in said series and closed at the end of each cycle and maintained closed until the timer times out the next period of closure of the control valve.

6. An automatic lubrication system as set forth in claim 5 wherein the line between the reservoir and the inlet passages of the valves is provided upstream from the control valve with means for delivering lubricant under pressure from a supply into the reservoir to charge the reservoir.

7. An automatic lubrication system as set forth in claim 6 having a relief valve interconnected with the line between the reservoir and the inlet passages of the valves upstream from the control valve for preventing overloading of the reservoir.

8. An automatic lubrication system as set forth in claim 7 wherein the reservoir is chargeable with gas under pressure for pressurizing the lubricant therein, the lubricant under pressure serving as both a power source for the operation of the valves and as a source of the lubricant for delivery to the points of lubrication.

9. An automatic lubrication system as set forth in claim 5 wherein each of said valves is a divider valve having a bore and a piston member axially slidable in the bore by pressure of lubricant in the bore, the piston member of each valve being movable from a first position at one end of the bore to a second position at the other end of the bore to deliver a measured charge of lubricant out of said other end of the bore and being movable back to said first position to deliver a measured charge of lubricant out of said one end of the bore, the series of valves including a first valve and a last valve, and being operable in a sequence wherein the piston members of the valves are moved from their first to their second position in sequence and are then moved back from their second position to their first position in sequence, ending with the last valve, and wherein the sensor device acts in response to the movement of the piston member of the last valve back to its said first position to send the timing start signal to the timer thereby closing the control valve and starting the timing out of a period of closure of the control valve.

10. An automatic lubrication system as set forth in claim 9 wherein each piston member has an end at said one end of the respective bore and the sensor device comprises a switch-actuating member extending from said end of the piston member of the last valve out of the last valve, and a switch actuated by said switch-actuating member and connected in a circuit with the timer.

11. An automatic lubrication system as set forth in claim 10 wherein the line between the reservoir and the inlet passages of the valves is provided upstream from the control valve with a lubricant fitting for connection of a lubricant supply line for delivering the lubricant under pressure into the reservoir to charge the reservoir.

12. An automatic lubrication system as set forth in claim 11 having a relief valve interconnected with the line between the reservoir and the inlet passages of the valves upstream from the control valve for preventing overloading of the reservoir.

13. An automatic lubrication as set forth in claim 12 wherein the reservoir is chargeable with gas under pressure for pressurizing the lubricant therein, the lubricant under pressure serving as both a power source for the operation of the valves and as a source of the lubricant for delivery to the points of lubrication.

14. An automated self-powered lubrication system for automatically periodically delivering metered charges of lubricant to a plurality of points of lubrication, said system comprising:

a plurality of lubricant metering devices, each operable by the lubricant under pressure, for dispensing metered charges of the lubricant to points of lubrication;

a reservoir for holding the lubricant under pressure for supplying the metering devices with the lubricant under pressure serving as both a power source for the operation of the devices and as a source of the lubricant to be dispensed;

said reservoir being chargeable with the lubricant and adapted to be conditioned for pressurizing the lubricant for a prolonged period of operation of the system;

said reservoir being interconnected with said metering devices for supplying power for operating said devices as well as supplying the lubricant to be dispensed thereby, a mechanism controlling delivery of pressurized the lubricant from the reservoir to said metering devices; and closed loop control means for the system comprising a timer operable upon receiving a timing start signal to close the mechanism and time out a dwell period during which the valve is maintained closed and the system dwells, and operable upon termination of said dwell period to open the mechanism for delivering the pressurized the lubricant from the reservoir to the metering devices for operating said devices, and a sensor device responsive to operation of the metering devices to send a timing start signal to the timer to close the mechanism after one full cycle and start the timing of a dwell period;

whereby at the termination of each dwell period the mechanism is opened for delivery of the pressurized the lubricant from the reservoir to the metering devices and closed on operation of the metering devices and maintained closed until the timer times out the next dwell period.

15. An automated self-powered lubrication system as set forth in claim 14 wherein the reservoir is charged with an initial force which is capable of pressurizing the lubricant.

16. An automated self-powered lubrication system as set forth in claim 14 wherein the reservoir has a mechanism for introduction of the lubricant into reservoir and storing it under pressure, thus creating a source of potential energy for operating the system metering device.

17. An automated self-powered lubrication system as set forth in claim 14 wherein the metering devices are operable through a cycle in which metered charges of the lubricant are delivered one after another in sequence to said points of lubrication, and the sensor device is responsive to completion of each cycle to send a valve closing and timing start signal to the timer.

* * * * *